United States Patent Office 3,590,066
Patented June 29, 1971

3,590,066
HYDROCARBYL BORATE PRODUCTION
USING OZONE
Hans D. Holtz, Bartlesville, Okla., assignor to
Phillips Petroleum Company
No Drawing. Filed Sept. 12, 1966, Ser. No. 578,479
Int. Cl. C07f 5/04
U.S. Cl. 260—462                    3 Claims

ABSTRACT OF THE DISCLOSURE

Hydrocarbyl borates are produced by reacting saturated hydrocarbons with oxygen and a boron-containing compound in the presence of ozone and in a solvent medium.

This invention relates to the formation of hydrocarbyl esters of boric acid (hydrocarbyl borates). In one aspect, it relates to a method for increasing the reaction rate between a hydrocarbon and a boron-containing compound in the presence of oxygen by promoting the reaction with ozone. In another aspect, it relates to a method for reducing the temperature of reaction of a hydrocarbon with a boron-containing compound and oxygen by conducting the reaction at a reduced temperature in the presence of ozone. In another aspect, it relates to an improved method of reacting higher molecular weight hydrocarbons with a boron-containing compound and oxygen by conducting the reaction in a solvent medium. In yet another aspect, it relates to a method for forming a hydrocarbyl borate by reacting a saturated hydrocarbon with a boron-containing compound and oxygen in the presence of a solvent having a lower boiling point than the saturated hydrocarbon. In yet another aspect, it relates to an improved method for forming hydrocarbyl borates by reacting cyclic or acyclic saturated hydrocarbons with oxygen and a boron-containing compound in the presence of ozone and in a solvent medium. In yet another aspect, it relates to a method for forming a monoolefinically unsaturated hydrocarbon from a saturated hydrocarbon by reacting the saturated hydrocarbon with a boron-containing compound and oxygen in the presence of ozone and/or in the presence of a suitable solvent, and subsequently pyrolyzing the hydrocarbyl borate to produce a monoolefinically unsaturated hydrocarbon.

Hydrocarbyl esters of boric acid can conventionally be prepared by reacting a hydrocarbon with a boron-containing compound in the presence of oxygen to a temperature of about 180° C. The boron compounds used in such reactions are generally the boron-containing acids such as orthoboric acid, metaboric acid, and tetraboric acid, as well as boron oxide. The reaction is normally carried out in a reactor having a reflux condenser attached overhead. This condenser serves to reliquefy vapors driven from the reactor, and allow them to return to the reactor.

When the lower boiling hydrocarbons are being reacted, there is a considerable escape of vapors from the reactor at the temperature involved. These vapors can be condensed in the reflux condenser, but this of course requires expenditure of a considerable amount of cooling water through the condenser. On the other hand, when the higher molecular weight hydrocarbons are being used, any vapors which rise from the reactor will not only condense on the reflux condenser, but will actually solidify there, causing plugging of the condenser tubes. Thus, difficulties are experienced with the conventional process when using both the lighter and the heavier hydrocarbons for formation of hydrocarbyl borates.

It is therefore an object of this invention to improve the efficiency of formation of hydrocarbyl borates from boron-containing compounds and light hydrocarbons by reducing the temperature of the reaction. It is another object of this invention to increase the rate of reaction of boron-containing compounds and saturated hydrocarbons. It is still another object of this invention to prevent plugging of the reflux condenser when heavy hydrocarbons are being reacted to form hydrocarbyl borates. It is a further object of this invention to form monoolefinically unsaturated hydrocarbons from cyclic or acyclic saturated hydrocarbons.

Other aspects, objects and the several advantages of the invention will be apparent to one skilled in the art upon a study of the disclosure, and the appended claims.

According to the invention, I reduce the temperature of reaction of hydrocarbons with a boron-containing compound and oxygen by conducting the reaction in the presence of ozone. With the ozone present, the reaction will take place at a substantially lower temperature than with prior art methods. Further, according to the invention, I prevent clogging of the reflux condenser with heavier hydrocarbons by conducting the reaction that forms hydrocarbyl borates in the presence of a solvent which has a lower boiling point than the hydrocarbon being reacted and is a solvent for the hydrocarbon being reacted.

The hydrocarbons which can be converted to hydrocarbyl borates by the process of my invention include all of the hydrocarbons which have been found suitable for use in the prior art processes. Broadly, this includes all of the saturated cyclic and acyclic hydrocarbons containing between about 5 and about 100 carbon atoms.

The boron-containing compounds are also the conventional ones, including orthoboric acid, metaboric acid, tetraboric acid and boron oxide. The boron-containing compound is used in an amount that provides at least one boron atom for each three molecules of hydrocarbon reactant, preferably an amount between 1 and 1.5 boron atoms per 3 molecules of hydrocarbon.

The reaction can be carried out in any suitable conventional equipment. For example, the reaction can be conducted in a reactor having a gas inlet at the bottom. This gas inlet can be equipped with a 100 to 200-mesh stainless steel screen or other device to allow passage of gas into the fluid, and the oxygen-containing gas can be bubbled into the reaction mixture through this device. Oxygen, air, or air mixed with nitrogen or other inert gas can be used as the oxygen-containing gas. According to the process of my invention, ozone can be generated by any desired method and passed into the reaction mixture. It can be added to the oxygen stream or it can be added separately if desired. In one preferred embodiment, an oxygen-containing stream is passed through an ozonator to form ozone in situ. Other suitable means of effecting the reaction, recovering products, and the like will be obvious to one skilled in the art.

In carrying out the process of my invention, the hydrocarbon and boron compound are charged to a reactor, and heated to a temperature between 50 and 180° C., preferably between 120 and 150° C. The gas mixture which is bubbled into the reactor will contain from 1 to 99.5 percent by weight of oxygen and between 0.01 and 10 percent by weight of ozone. It is generally preferred that this oxygen-containing stream be preheated to a temperature approximately equal to that of the reaction mixture. Flow rate of the gas into the reactor will vary with equipment design and other variables, but maximum rates of about 800 liters per hour per liter of liquid reaction mixture are generally preferred. This is equivalent to an ozone addition rate of between about 1 and about 80 liters per hour per liter of liquid reaction mixture. Pressures between 0.1 and 1000 atmospheres can be used, with atmospheric pressure generally being preferred. If desired, a cold trap may be attached to the outlet end of the reflux condenser to trap any vapors which escape condensation.

The use of ozone in this process permits use of a considerably lower temperature of reaction. For instance, normally, a temperature of about 130° C. is possible for a given reaction which previously required a temperature of 165° C. Alternately, a higher temperature can be retained in order to increase the rate of the reactions to form hydrocarbyl borates. Because of these advantages, it is also possible to use relatively lower concentrations of oxygen in the process, which makes possible the use of air as a low cost source of oxygen in many applications where it previously could not be used. Furthermore, the greater reaction rates at lower temperatures provide more production for equipment outlay, lower heat energy requirements, and reduce the problem of retaining lower molecular weight compounds within the system.

When higher molecular weight hydrocarbons are being reacted, the use of a solvent in accordance with this invention is desirable. This solvent not only reduces the viscosity of the system, thus promoting intermixing of the oxygen-containing gaseous stream with the liquid reaction mixture, but the solvent will also serve to keep the reflux condenser free of solidified hydrocarbon. This latter effect is of particular value when cycloaliphatic compounds are being reacted, since they have a much higher freezing point than the acyclic compounds.

The solvents which are suitable for use must be substantially inert to the reaction system at the particular reaction conditions employed, of lower boiling point than the hydrocarbon being reacted, soluble in the reactive hydrocarbon, and have a sufficiently low volatility that they will remain at least partly in the liquid phase during the reaction. In general, hydrocarbon solvents have been found most suitable. The currently preferred solvents are n-decane, hexane, heptane and benzene. The solvent is chosen for the particular reaction conditions employed since a particular hydrocarbon can be inert to the reaction under certain conditions, but be reactive under more strenuous conditions.

The solvent should be present in the reactor in a quantity from about 3 to about 80 percent by weight of the liquid reaction mixture. The solvent can be used either in the presence or absence of ozone in the oxygen stream, and can be used when the reaction temperature is anywhere between 100° C. and 200° C.

Because of the lower viscosity of the reaction mixture when using the solvents, better contact is obtained between the reactants in the reactor. Furthermore, this lower viscosity allows better distribution of the gas stream in the reactor, and consequently higher flow rates of gas can be used, thus increasing the rate of reaction.

Although it is frequently desired to use a pure hydrocarbon as a starting material in order to obtain a pure product, there are some instances in which a mixture of molecular weights in the product may be acceptable, and in such cases a hydrocarbon mixture can be used. The process of this invention can, in fact, be used to prepare a high purity product from a dilute feedstock because of the differing rates of reaction of the feedstock constituents.

It is important that the hydrocarbon feed for this reaction be substantially free if polyolefins, polycyclic aromatic compounds, and certain other impurities which inhibit the formation of hydrocarbyl borates. It has been found desirable, when dealing with such a hydrocarbon feed, to treat the feed with hot concentrated sulfuric acid, silica gel, or alumina in order to remove these compounds prior to introducing the feed to the reactor.

The hydrocarbyl borates formed by this process can be hydrolyzed by conventional techniques to produce alcohols. For example, after stripping any solvent or unreacted hydrocarbon from the hydrocarbyl borate product, the product is treated with water, under hydrolyzing conditions, and the alcohol is recovered. Components of the reaction system can be recovered for recycle if desired. The hydrocarbyl borates can also be pyrolyzed to produce monoolefinically unsaturated hydrocarbons. This pyrolysis is generally carried out at atmospheric pressure, but higher or lower pressures can be employed, if desired. Pressures as low as 10 mm. of Hg can be used, or pressures as high as 50 atmospheres also can be used. Temperatures of 150° C. to 500° C. are suitable, with temperatures between 200° C. and 350° C. being preferred. Suitable choice of temperature and pressure can be made to optimize production of any of a variety of desired monoolefinically unsaturated hydrocarbons and boron-containing compounds can be recovered from the residue after pyrolysis.

Monoolefinically unsaturated hydrocarbon products can be readily separated from any contaminants such as alcohols, suitable solvents, or boron-containing products by application of conventional procedures such as washing with water or dilute alkali and separation of the phases, preferably followed by application of a purification process such as distillation, chromatography, adsorption or the like to the organic phase, thereby obtaining the monoolefinically unsaturated hydrocarbons in substantially pure form.

The monoolefinically unsaturated hydrocarbons and alcohols that can be produced from the hydrocarbyl borates are useful as intermediates in chemical processes. The cycloalkenes and cycloalkanols are particularly valuable intermediates in processes for the production of polyamide resins.

The following examples demonstrate the advantages of the aspects of my invention.

EXAMPLE I

Dodecyl borates were prepared by charging a mixture consisting of 893 g. n-dodecane and 25 g. $B_2O_3$ into a 2-liter stainless steel reactor and passing through this a gas mixture composed of ozone, nitrogen, and air at the rate of 600 liters/hr. The gas mixture was formed by ozonating air to between 7.8 and 8.5 mg. $O_3$/liter of air and blending the ozone-air mixture with nitrogen to 4 percent by volume oxygen. The reactor temperature was maintained between 128 and 138° C. Reaction was carried out at substantially atmospheric pressure for 3 hours. An ice-water cooled stainless steel heat exchanger above the reactor returned n-dodecane to the liquid reaction mixture. The oxygen-ozone containing gas was introduced through a 150–200 mesh stainless steel screen that formed the bottom of the tubular reactor. At the end of the reaction period, unreacted n-dodecane was distilled at 20 mm. Hg and collected for recycle. A Dry Ice trap above the heat exchanger retained any water and organic materials that passed the heat exchanger. The reaction product was then cooled and treated with sufficient water to hydrolyze the esters. Boric acid and n-dodecanol hydrolysis products showed that the reaction product was substantially an ester of boric acid and n-dodecanols. The hydrolysis reaction was followed visually by the boric acid migration to the aqueous phase. The hydrolysis product was then fractionally distilled to separate the components. The results are summarized below:

|  | Gm. |
|---|---|
| n-Dodecane feed | 893 |
| n-Dodecane recovered | 788 |
| n-Dodecane used | 105 |
| n-Dodecanols recovered | 44 |
| n-Dodecanones recovered (mixture of isomers) | 7.4 |

Thus, by the process of my invention, there was a conversion of 11.8 mol percent of the n-dodecane.

EXAMPLE II

The run of Example I was repeated using the same conditions, techniques and equipment except 888 gm. of n-dodecane instead of 893 gm. of n-dodecane were used and the ozonator was not turned on. The results are summarized below:

|  | Gm. |
|---|---|
| n-Dodecane feed | 888 |
| n-Dodecane recovered | 837 |
| n-Dodecane used | 51 |
| n-Dodecanols recovered | 16.5 |
| n-Dodecanones recovered | 0.5 |

Thus, the run by the prior art methods yields a conversion of 5.8 mol percent, or approximately one-half the conversion obtained by the process of my invention.

EXAMPLE III

Cyclododecyl borate was prepared by charging a mixture consisting of 875 g. cyclododecane, 160 g. n-decane, and 40 g. $B_2O_3$ into a 2-liter stainless steel reactor and passing through this a gas mixture composed of nitrogen and air at the rate of 510 liters/hour. The gas mixture containing 4 percent oxygen by volume was heated to the reactor temperature of $\pm 165°$ C. Reaction was carried out at substantially atmospheric pressure for 3 hours. An ice-water cooled stainless steel heat exchanger above the reactor returned cyclododecane to the liquid reaction mixture. The n-decane functioned as a solvent to promote efficient reaction of the cyclododecane by effecting intimate contact of the cyclododecane with other reactants in the liquid phase reaction mixture. The n-decane also acted as a solvent to keep solidified cyclododecane from plugging the heat exchanger at the flow rate of gas used. Being more difficultly oxidized under reactor conditions, the n-decane did not undergo appreciable reaction. The oxygen containing gas was introduced through a 150–200 mesh stainless steel screen that formed the bottom of the tubular reactor. At the end of the reaction period, unreacted cyclododecane and n-decane were distilled at 20 mm. Hg and collected for recycle. A Dry Ice trap above the heat exchanger retained any water and organic materials that passed the heat exchanger. The reaction product was then cooled and treated with sufficient water to hydrolyze the esters. The product was then fractionally distilled to separate the components. The results are summarized below:

cyclododecane used, 213.4 g., conversion 24 mol percent
cyclododecanol recovered, 189.0 g., efficiency 81 mol percent
cyclododecanone, 12,9 g., efficiency 6 mol percent

EXAMPLE IV

Cyclododecane and $B_2O_3$ were charged into equipment as in Example III, but without the n-decane solvent. The same method of oxidation was employed. However, cyclododecyl borate was not formed in appreciable quantity and the heat exchanger soon plugged with cyclododecane.

It is thus seen by comparison of Examples III and IV that certain hydrocarbons can be reacted to form hydrocarbyl borates when using solvents in accordance with the process of my invention which cannot be converted satisfactorily according to the prior art methods.

EXAMPLE V

Cyclododecyl borate was prepared in accordance with the method set forth in Example III. At the end of the reaction period, unreacted cyclododecane and n-decane were distilled and collected for recycle. The reaction product, composed largely of hydrocarbyl borates was then pyrolyzed at a temperature of 250° C. until evolution of cyclododecene had substantially ceased. An 85° percent yield of cyclododecene was obtained as based on unrecovered cyclododecane. The cyclododecene was 96 percent purity. Conversion of cyclododecane to cyclododecene was 16.4 mol percent.

Numerous variations and modification are possible within the scope of the foregoing invention disclosure and appended claims, the essence of which is that the reaction forming hydrocarbyl borates from hydrocarbons, oxygen and a boron-containing compound is conducted in the presence of ozone and/or a solvent. In one embodiment, the esters so formed are further converted to monoolefinically unsaturated hydrocarbons by pyrolysis.

I claim:
1. Process for producing a hydrocarbyl borate comprising contacting at a temperature between 50 and 180° C. a hydrocarbon selected from the group consisting of acyclic and cyclic saturated hydrocarbons having from about 5 to about 100 carbon atoms in the liquid phase with oxygen, ozone and a boron containing compound selected from the group consisting of orthoboric acid, metaboric acid, tetraboric acid, and boron oxide, the amount of ozone introduced into said reaction being at a rate of from about 1 to about 80 liters per hour per liter of liquid reaction mixture.

2. Process of claim 1 wherein said temperature is below about 150° C.

3. Process of claim 1 wherein said hydrocarbon is n-dodecane and said boron-containing compound is $B_2O_3$.

References Cited

UNITED STATES PATENTS

| 3,160,639 | 12/1964 | Long et al. | 260—346.1 |
| 3,238,238 | 3/1966 | McNamara et al. | 260—452 |
| 3,251,888 | 5/1966 | Toland | 260—618 |
| 3,301,887 | 1/1967 | Kirshenbaum et al. | 260—462 |
| 3,442,959 | 5/1969 | Sugerman | 260—X462OX |

OTHER REFERENCES

Groggins: Unit Processes in Organic Synthesis, McGraw-Hill, 1958, p. 502.

LEON ZITVER, Primary Examiner

L. DECRESCENTE, Assistant Examiner

U.S. Cl. X.R.

260—617, 631, 639, 666, 682, 593, 586